United States Patent [19]
Kraus

[11] Patent Number: 5,433,675
[45] Date of Patent: Jul. 18, 1995

[54] TRACTION ROLLER TRANSMISSION

[75] Inventor: Charles E. Kraus, Austin, Tex.

[73] Assignees: Excelermatic Inc., Austin, Tex.;

[21] Appl. No.: 158,435

[22] Filed: Nov. 29, 1993

[51] Int. Cl.⁶ .................. F16H 13/10; F16H 15/38
[52] U.S. Cl. .......................... 476/67; 476/32;
  476/33; 476/40; 476/72; 475/216; 74/352
[58] Field of Search ............ 475/183, 192, 214, 216;
  476/21, 31, 32, 33, 40, 50, 72, 67; 74/352

[56] References Cited

U.S. PATENT DOCUMENTS

| | | | |
|---|---|---|---|
| 43,387 | 7/1864 | Blandy | 476/67 |
| 260,532 | 7/1882 | Campbell | 476/67 |
| 2,774,247 | 12/1956 | Knost | 476/67 |
| 3,039,317 | 6/1962 | Wilson | 74/352 |
| 3,945,270 | 3/1976 | Nelson et al. | 476/67 |

FOREIGN PATENT DOCUMENTS 2108599  5/1983  United Kingdom ............ 475/216

*Primary Examiner*—Rodney H. Bonck
*Assistant Examiner*—Sherry Lynn Estremsky
*Attorney, Agent, or Firm*—Klaus J. Bach

[57] ABSTRACT

The invention resides in an infinitely variable traction roller transmission with coaxial input and output shafts, a main transmission shaft rotatably supported in spaced parallel relationship with the input and output shafts and with an input traction roller drive interconnecting the input shaft and the main shaft and further an infinitely variable traction roller transmission structure disposed on the main shaft for transmitting motion from the main shaft at variable relative speed to the output shaft via an output traction roller drive wherein the input and output traction roller drives include traction gears mounted in radial alignment respectively on the input shaft and the main shaft and an output shaft of he infinitely variable traction roller transmission and hollow shaft surrounding the input shaft and connected to one of the ring and the planet carrier of a planetary-type transmission whose other of the ring and planet carrier is connected to the output shaft and whose sun is disposed on the input shaft and the traction roller drives include motion transmitting traction structures arranged so as to be engageable with both traction gears of the traction roller drive and it also resides specifically in the traction roller drive structures used in the transmission.

10 Claims, 5 Drawing Sheets

TRACTION ROLLER TRANSMISSION

BACKGROUND OF THE INVENTION

1. Field of the Invention

The invention relates to a traction roller transmission, and particularly to an infinitely variable traction roller transmission with traction drives for transmitting motion through the transmission.

2. Description of the Prior Art:

Applicant's U.S. Pat. No. 4,964,312 describes an infinitely variable traction roller transmission with coaxial input and output shafts and a main transmission shaft supported in a transmission housing in parallel spaced relationship with the input and output shafts and with two infinitely variable topic traction roller transmission structures disposed on the main shaft For varying the ratio of transmission from the main transmission shaft to the output shaft. Motion is transmitted From the input shaft to the main transmission shaft by means of a first spur gear structure and back to the output shaft via a second gear structure arranged between the two infinitely variable toric traction roller transmission structures and an intermediate shaft arrangement disposed coaxially with the input and output shaft and carrying a clutch structure and brake structure needed for switching between the various operating modes of the transmission.

A similar transmission operable in several forward transmission modes fop a wide transmission operating range is described in U.S. Pat. No. 4,885,955.

Both need relatively expensive gear arrangements for the transmission of motion between the shafts and clutches fop appropriately engaging or disengaging various shafts in the various operating modes.

SUMMARY OF THE INVENTION

The invention resides in an infinitely variable traction roller transmission with coaxial input and output shafts, a main transmission shaft rotatably supported in spaced parallel relationship with the input and output shafts and with an input traction roller drive interconnecting the input shaft and the main shaft and further an infinitely variable traction roller transmission structure disposed on the main shaft for transmitting motion from the main shaft at variable relative speed to the output shaft via an output traction roller drive wherein the input and output traction roller drives include traction gears mounted in radial alignment respectively on the input shaft and the main shaft and an output shaft of the infinitely variable traction roller transmission and a hollow shaft surrounding the input shaft and connected to one of the ring and the planet carrier Of a planetary-type transmission whose other of the ring and planet carrier is connected to the output shaft and whose sun is disposed on the input shaft and the traction roller drives include motion transmitting traction structures arranged so as to be engageable with both traction gears of the traction roller drive and the invention also resides specifically in the traction roller drive structures used in the transmission.

With this transmission no clutches are needed for switching between the operating modes of the transmission as the novel traction drives used fop transferring motion between the main and the input and output shafts can also take over the role of clutches. The traction drives are reliable and, compared to normal gears, quite inexpensive so that they reduce expenses for manufacturing such an infinitely variable transmission considerably.

DESCRIPTION OF THE PREFERRED EMBODIMENTS

Figure 1:
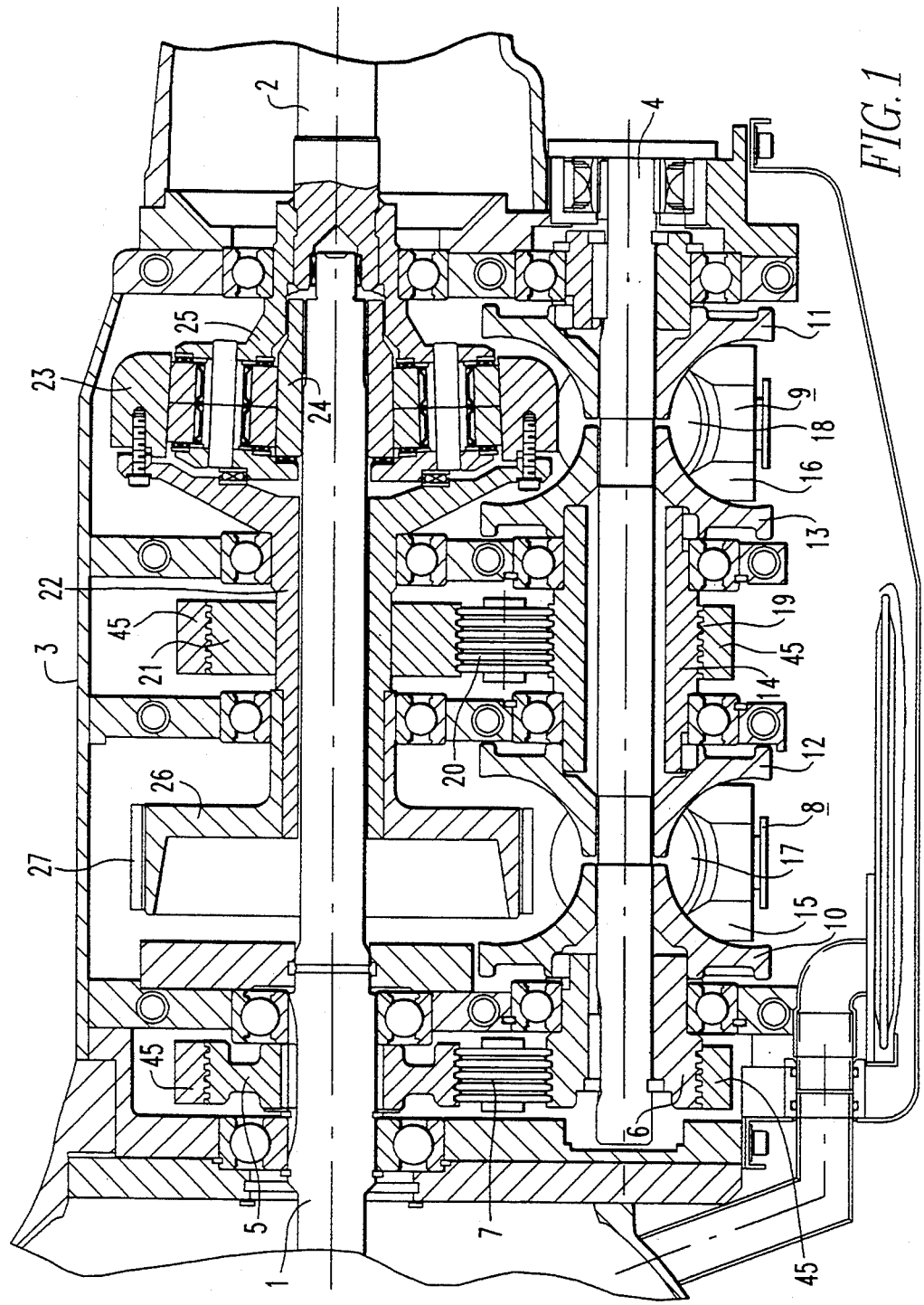
FIG. 1 shows a transmission including two transmission structures according to the invention.

The transmission as shown in FIG. 1 has an input shaft 1 and an output shaft 2 supported in a housing 3 in axial alignment with one another and a parallel main shaft 4 supported in the housing 3 in parallel spaced relationship with respect to the input and output shafts 1 and 2. The input shaft 1 has a traction gear 5 mounted thereon and the main shaft has a corresponding traction gear 6 mounted thereon in radial alignment with the traction gear 5 and a motion transmitting intermediate traction roller 7 is supported in the area between the two traction gears so as to be engageable with both for the transmission of motion there between as will be explained later. The main shaft 4 has two infinitely variable traction roller transmission structures 8 and 9 associated therewith in the manner as disclosed in Applicant's earlier U.S. Pat. No. 4,964,312. They include toric discs 10, 11 mounted on the main shaft 4 and toric discs 12, 13 mounted on a first hollow shaft 14 and arranged opposite the toric discs 10, 11 so as to define the therebetueen toric cavities 15 and 16 in which motion transmitting traction rollers 17 and 18 are pivotally supported so as to be able to transmit motion therebetween at a transmission ratio which depends on the pivot position of the traction rollers 17 and 18. They permit rotation of the hollow shaft 14 at a variable speed relative to the main shaft 4 which extends through the hollow shaft 14.

The hollow shaft 14 includes a traction gear structure 19 which, via traction roller 20, is in engagement with a traction gear 21 mounted on a second hollow shaft 22 through which the input shaft 1 extends. The second hollow shaft 22 carries at its end adjacent the output shaft 2 the outer ring 23 of a planetary type traction roller transmission whose sun roller 24 is mounted on the input shaft 22 and whose planetary rollers are disposed in the annular space between the sun roller 24 and the traction ring 23 and are supported by a planetary roller carrier 25 mounted on the output shaft 2. At its other end, the second hollow shaft 22 carries a brake drum 26 with a brake band 27 by which the second hollow shaft 22 can be arrested.

Figure 2:
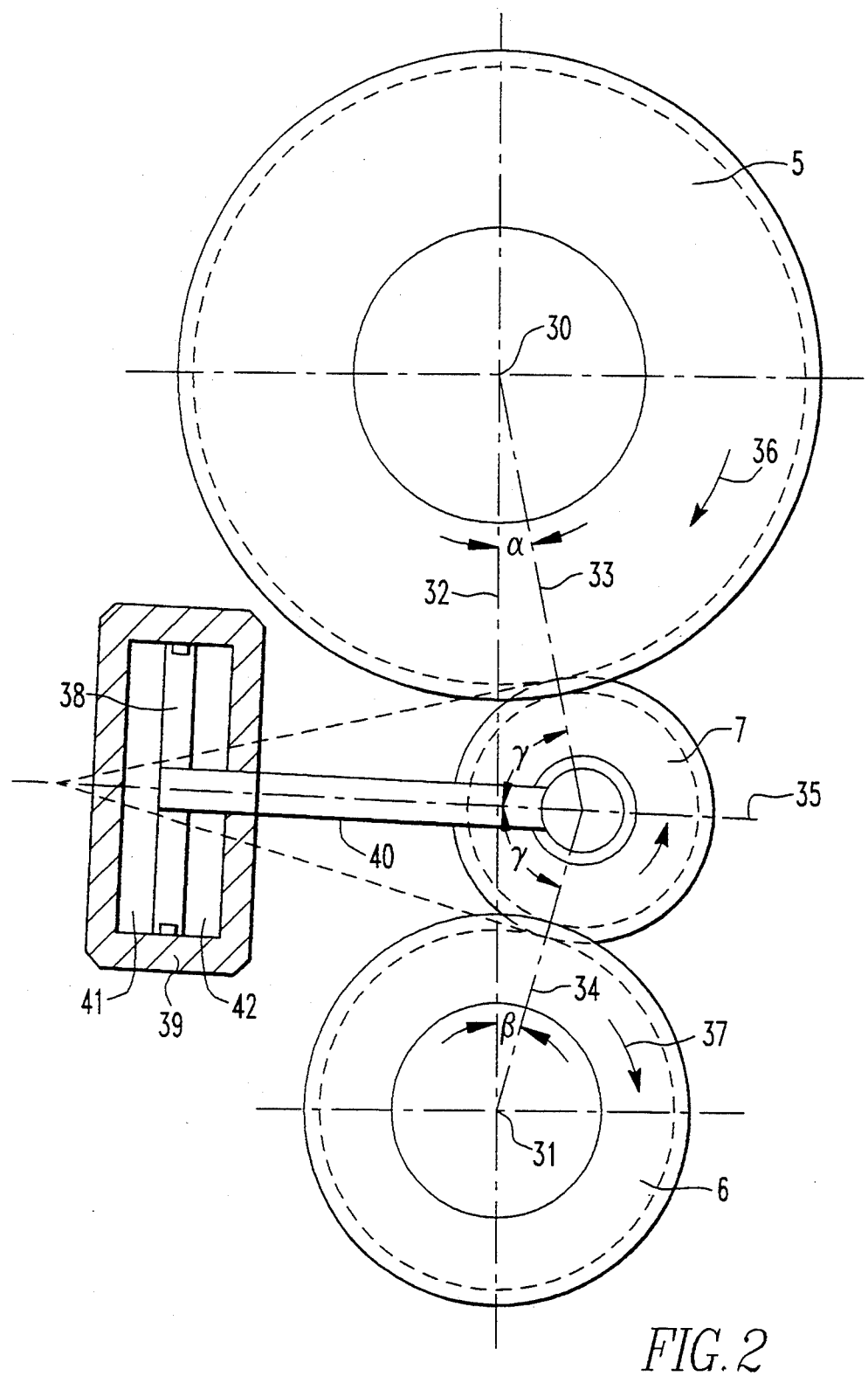
FIG. 2 shows schematically the transmission structure.

The traction gear and traction roller arrangements 5, 6, 7 and 19, 21, 20 are shown schematically in FIG. 2 to explain their operation. However, for simplification in FIG. 2 only the reference numerals 5, 6 and 7 are used. Traction gears 5 and 6 are supported for rotation about spaced axes 30 and 31 and have diameters such that a space remains between them. A traction roller 7 with a diameter somewhat larger than the space between the traction gears 5 and 6 is disposed between the traction gears and means are provided for pulling the traction roller 7 into the space between the traction gears 5 and 6 so as to engage both for the transmission of motion from one to the other of the traction gears. Because it is larger than the space between the traction gears 5 and 6 the center traction roller 7 is somewhat offset from the centerline 32 between the traction gears 5 and 6 so that an angle $\alpha$ is formed between the centerline 32 extending between traction gears 5 and 6 and the centerline 33 between the traction gear 5 and the traction roller 7, and an angle $\beta$ is defined between the centerline 32, traction gear 6—traction gear 5, and the centerline 34, traction gear 5—traction roller 7. This provides for an angle between the centerlines 33 and 34 of $180-\alpha-\beta°$ and gives the preferred direction of pulling or pushing the traction roller 7 between the traction gears 5 and 6 along the angle bisector 35 with enclosing angles with the centerlines 33 and 34 of $\gamma=180-\alpha-\beta/2°$.

It is noted that the direction of rotation of the driving traction gear 5 is indicated by an arrow 36 and the direction of rotation of the driven traction gear is indicated by an arrow 37 so that the torque transmitted from the traction gear 5 to the traction gear 6 aids in pulling the traction roller 7 into the space between the traction gears 5 and 6 and the forces applied by the engaging means can be relatively small depending on the selection made for angles $\alpha$ and $\beta$. They are selected to be large enough to require an engaging force in order to avoid pulling the traction roller 7 through the space between the traction gears 5 and 6.

As shown in FIG. 2 the engaging means consists of a piston 38 disposed in a cylinder 39 and connected to the traction roller 7 by means of a rod 40. The cylinder 39 preferably has operating chambers 41 and 42 at opposite sides of the piston 38 to permit either to pull the traction roller 7 into firm engagement with the traction gears 5 and 6 or to move it in opposite direction disengagement from the traction gears 5 and 6, so that the arrangement may be operated, at the same time, as a clutch.

Figure 3:
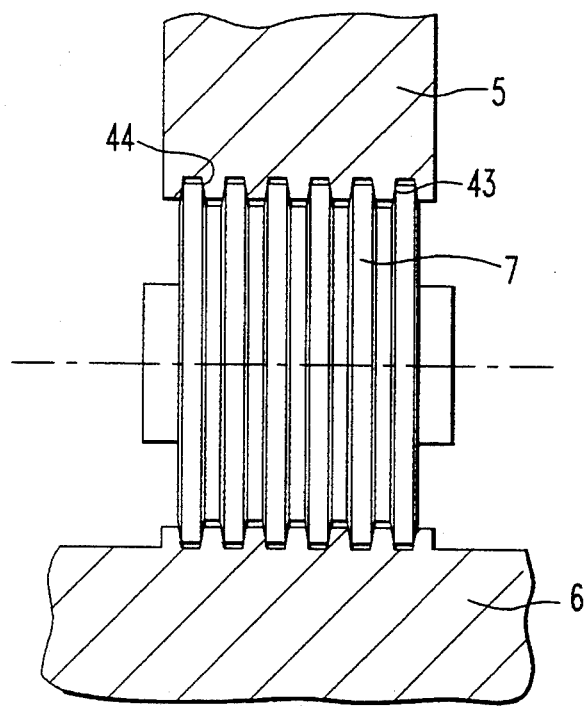
FIG. 3 shows a grooved traction roller in engagement with the two traction rollers between which it transmits motion.
Figure 4:
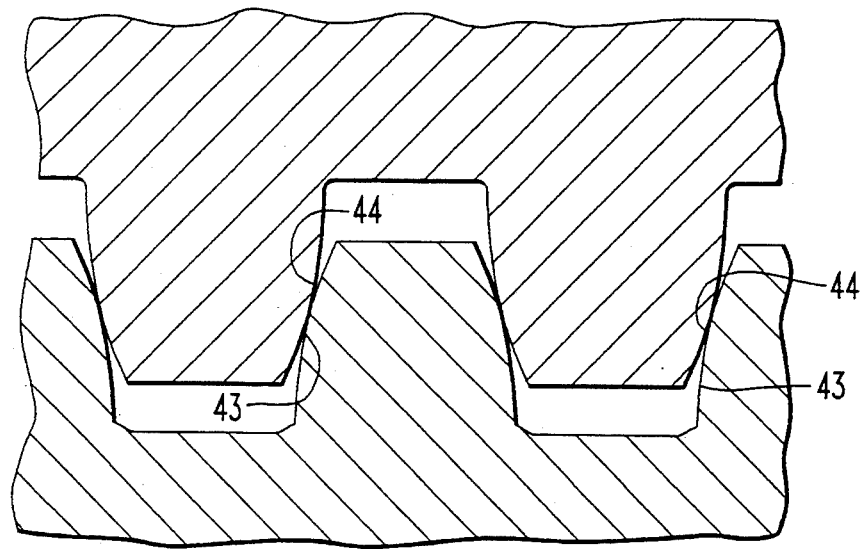
FIG. 4 is an enlarged view of the side surfaces of the roller grooves engagement with one another.

As shown in FIG. 3 the traction roller 7 and traction gears 5 and 6 have circumferential grooves and projections with inclined surfaces 43, 44 along which they are engaged in order to minimize the radial engagement forces needed. As shown in FIG. 4, the inclined side surfaces 43 and 44 are slightly curved in order to minimize spin losses and the resulting wear of the surfaces.

Figure 5:
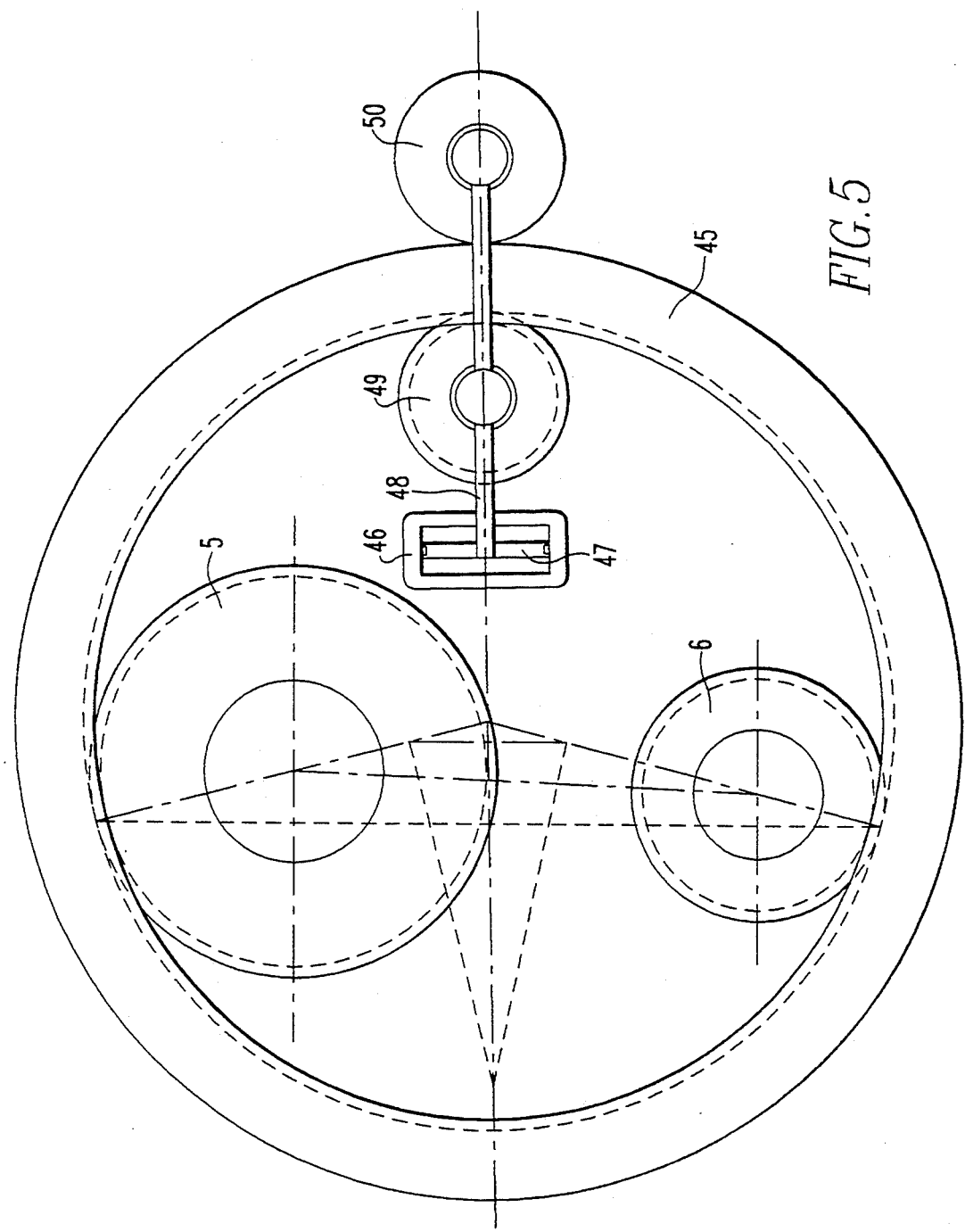
FIG. 5 shows the transmission with an arrangement wherein motion is transmitted by way of a traction ring.

While in the arrangement of FIG. 2 the traction gears 5 and 6 are engaged with one another by way of a traction roller 7 disposed between the traction gears 5 and 6, FIG. 5 shows an arrangement wherein the traction gears 5 and 6 are in engagement with one another via a traction ring 45 which extends around the traction gears 5 and 6 and whose inner diameter is slightly larger than the combined diameters of the traction gears and their distance from each other. A control roller arrangement is provided which includes a cylinder 46 with a piston 47 and a piston rod 48 carrying spaced control rollers 49 and 50 between which the traction ring 45 is engaged so that it can be moved into firm engagement with the traction gears for the transmission of motion therebetween or in opposite direction out of engagement with the traction gears so that no motion is transmitted therebetween.

Figure 6:
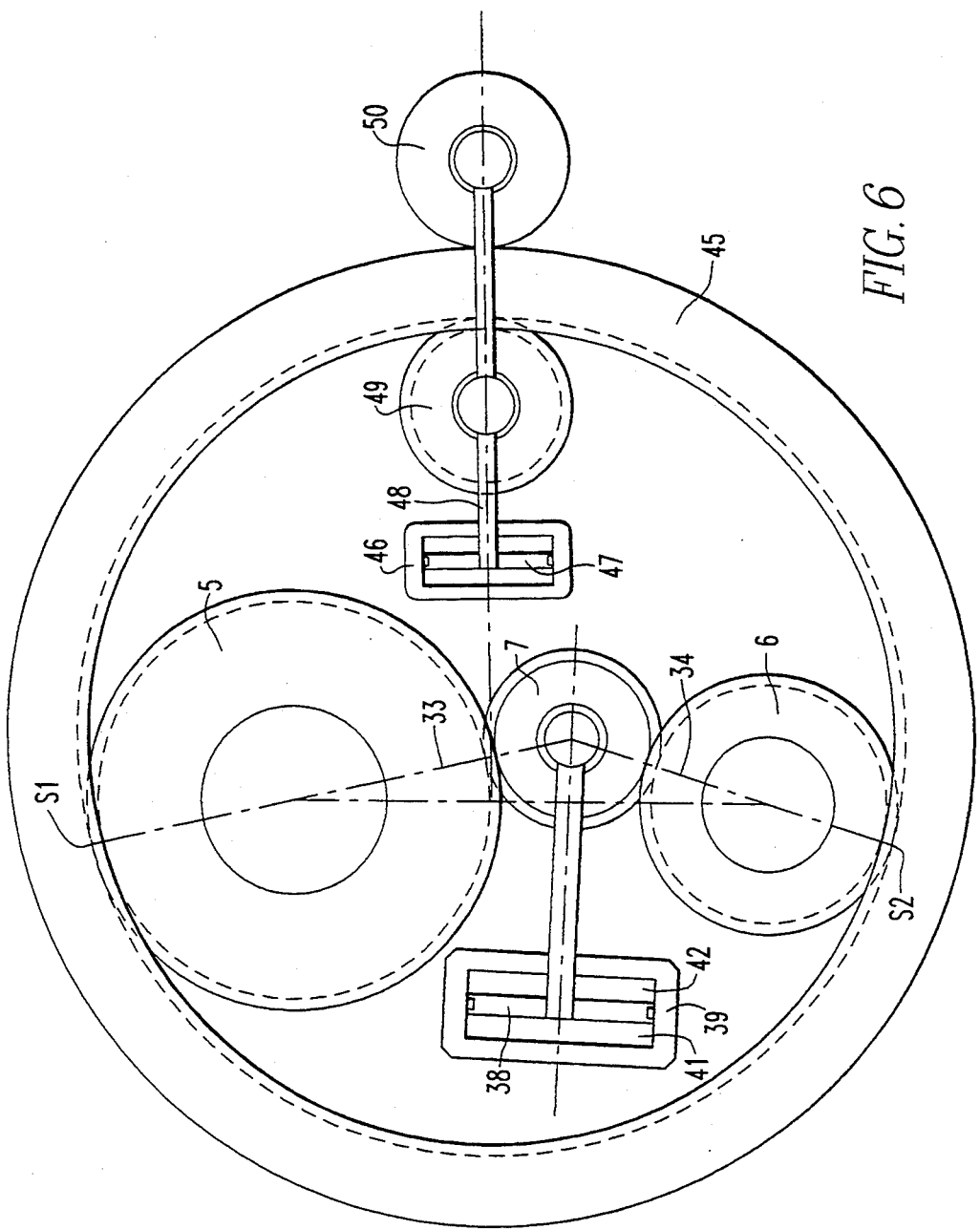
Fig. 6 shows the transmission structure schematically with a traction ring surrounding the arrangement for taking up all the engagement forces and for partial torque transmission.

The arrangement of FIG. 6 is a combination of those according to FIG. 2 and FIG. 5 and, accordingly corresponding parts are indicated by the same reference numerals so that a particular explanation is not necessary. It is noted, however, that, with a traction roller pulled into the space between the two traction gears 5 and 6 and a traction ring appropriately sized such that it is in contact with the traction gears 5 and 6 at the intersections S1 and S2 of lines 33 and 34 with the traction ring, and with the traction ring being pulled in a direction and a force essentially opposite to the force with which the traction roller 7 is pulled between the traction gears 5 and 6, there is essentially no load on the bearings supporting the two traction gears. In addition a good part of the torque is transmitted through the traction ring 45 so that the contact surface load is also greatly reduced. For many applications this is an important feature and the transmission structures 5, 6, 7 and 19, 20, 21 in FIG. 1 are therefore shown to include such a traction ring 45.

Operation of the transmission shown in Fig. 1 is as follows: With the traction roller 7 in engagement with the traction gears 5 and 6, rotation of the input shaft 1 is transmitted to the main transmission shaft 4 and from there at variable speed through the infinitely variable transmission structures 8 and 9 to the first hollow shaft 14 and, via traction roller 20 which is in engagement with the traction gears 19 and 21, to the second hollow shaft 22 disposed on the input shaft 1. In this mode, the brake band 27 is released so that the drum 26 and the second hollow shaft 22 with the traction ring 23 of the planetary traction roller transmission structure can rotate at a relative speed as controlled by the infinitely variable transmission structures 8 and 9.

In the arrangement as shown in FIG. 1 the main shaft 4 rotates in the same direction as the input shaft 1 and the first hollow shaft 14 rotates in opposite direction so that also the second hollow shaft 22 and the traction ring 23 rotate in a direction opposite to that of the input shaft 1 and the sun roller 24 of the planetary transmission structure. The planetary roller carrier 25 which is mounted on the output shaft 2 therefore operates at a reduced speed relative to the speed of the input shaft 1 which is variable with the speed of the traction ring 23 as controlled by the infinitely variable transmission structures 8 and 9.

For reverse, the hollow second shaft 22 and the traction ring 23 are locked in position by tightening of the brake band 27. At the same time, at least one of the traction rollers 7 and 20, preferably traction roller 7, is disengaged from the traction gears 5 and 6 whereby the infinitely variable transmission structures 8 and 9 are placed out of operation and power is transmitted from the input shaft 1 to the output shaft 2 solely via the planetary traction roller transmission with a speed reduction provided by the selected dimensions of the planetary traction roller transmission.

With the arrangement described herein a transmission is provided in which, with inexpensive components, the need for clutches for switching from one operating mode to another is avoided and, if the traction roller drive structures are surrounded by traction rings, bearing loads are greatly reduced.

What is claimed is:

1. An infinitely variable traction roller transmission including coaxial input and output shafts rotatably supported in a transmission housing, a main shaft rotatably supported in said housing in spaced parallel relationship with said input and output shafts, an input traction roller drive comprising a first traction gear mounted on said input shaft, a second traction gear mounted on said main shaft in radial alignment with said first traction gear and a motion transferring traction structure arranged so as to be engageable with both said first and second traction gears for transmitting motion from said input shaft to said main shaft, at least one infinitely variable traction roller transmission structure having an input connected for rotation with said main shaft and an output connected for rotation with one traction gear of an output traction roller drive whose other traction gear is mounted on a hollow shaft rotatably supported around said input shaft and also including a motion transferring traction structure engageable with both, said one and other traction gears for the transmission of motion therebetween, said hollow shaft being connected at one end thereof to a planetary type transmission including a ring and a carrier carrying planetary rollers disposed in an annular space between said ring and a sun structure mounted on said input shaft, said output shaft being connected to one and said hollow shaft being connected to the other of said carrier and said ring.

2. An infinitely variable transmission according to claim 1, wherein at least one of said motion transferring traction structures is a traction roller sized and arranged so as to be movable into the space between the respective traction gears and means are provided for forcing said traction roller into engagement with the respective traction gears for the transmission of motion between said traction gears and for disengaging said traction roller from said traction gears.

3. An infinitely variable transmission according to claim 1, wherein at least one of said motion transferring traction structures is a traction ring arranged so as to surround the respective traction gears and having an inner diameter somewhat larger than the combined diameters of the traction gears plus their distance from one another and means are provided for forcing said traction ring into engagement with said traction gears for the transmission of motion between said traction gears and for disengaging said traction ring from said traction gears.

4. An infinitely variable transmission according to claim 1, wherein at least one of said motion transferring traction structures includes a traction roller sized and arranged so as to be movable into the space between the respective traction gears and means are provided for forcing said traction roller into engagement with said traction gears permitting the transmission of motion between said traction gears and for disengaging said traction roller from said traction gears and a traction ring surrounding said traction gears for counteracting the engagement forces applied by said traction roller to said traction gears and transmitting part of any torque transferred through said traction structure.

5. An infinitely variable transmission according to claim 4, wherein said traction ring has an inner diameter somewhat larger than the combined diameters of the traction gears plus their distance from one another and means are provided for forcing said traction ring into engagement with said traction gears permitting the transmission of motion between said traction gears and for disengaging said traction ring from said traction gears, said means for forcing said traction ring into engagement with said traction gears being arranged so as to act in a direction essentially opposite to that of the means forcing said traction roller into engagement with said traction gears.

6. An infinitely variable transmission according to claim 1, wherein said traction gears and said motion transferring traction structures are provided with grooves including inclined side surfaces which are slightly curved in radial direction and by which said traction gears and said motion transmitting traction structures are engaged with one another.

7. A motion transmitting traction drive comprising first and second traction gears mounted for rotation about parallel spaced axes such that a space remains between the two traction gears and a motion transferring traction structure arranged so as to be engageable with both said first and second traction gears, said motion transferring traction structure including a traction roller sized and arranged so as to be movable into the space between said traction gears and means for forcing said traction roller into engagement with said traction gears to permit the transmission of motion between said traction gears and for disengaging said traction roller from said traction gears and a traction ring surrounding said traction gears for counteracting the engagement forces applied by said traction roller to said traction gears and transmitting part of any torque transferred through said traction structure.

8. A motion transmitting traction drive according to claim 7, wherein said traction ring has an inner diameter somewhat larger than the combined diameters of the traction gears plus their distance from one another and means are provided for forcing said traction ring into engagement with said traction gears.

9. A motion transmitting traction drive according to claim 8, wherein said means for forcing said traction ring into engagement with said traction gears are arranged so as to act in a direction essentially opposite to that of said means for forcing said traction roller into engagement with said traction gears.

10. A motion transmitting traction drive according to claim 7, wherein said traction gears and said motion transferring traction structures are provided with grooves including inclined side surfaces which are slightly curved in radial direction and by which said traction gears and said motion transmitting traction structures are engaged with one another.

* * * * *